July 14, 1970  A. L. HANES  3,520,639
VENTURI TUBE
Filed Aug. 21, 1968
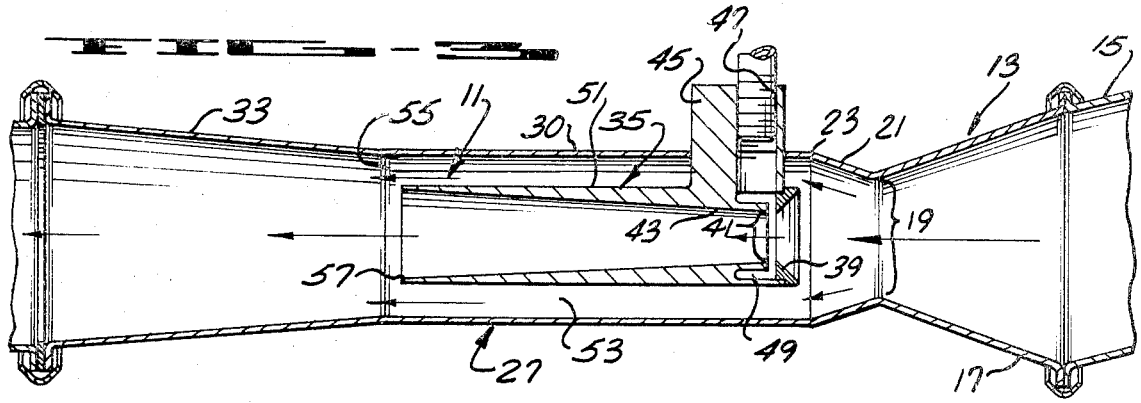
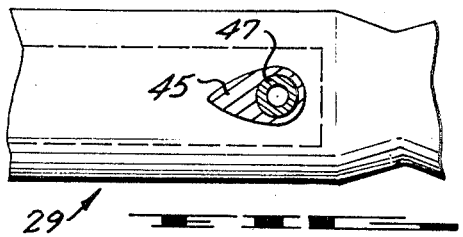
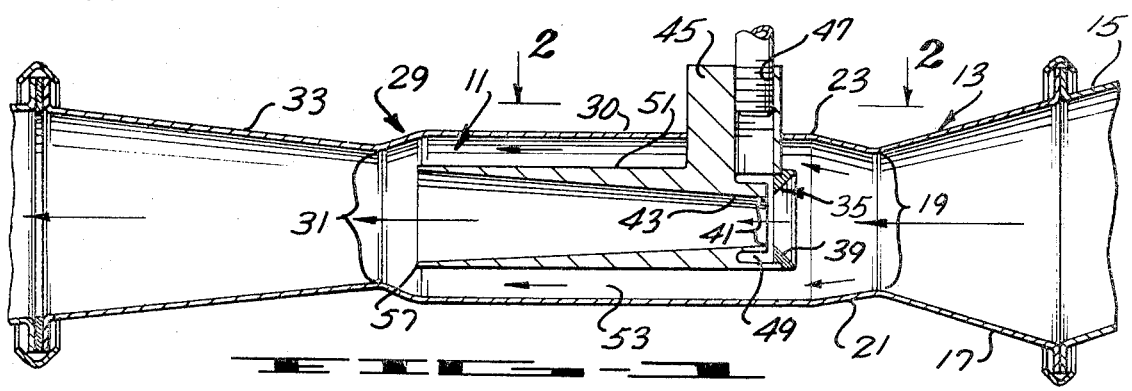
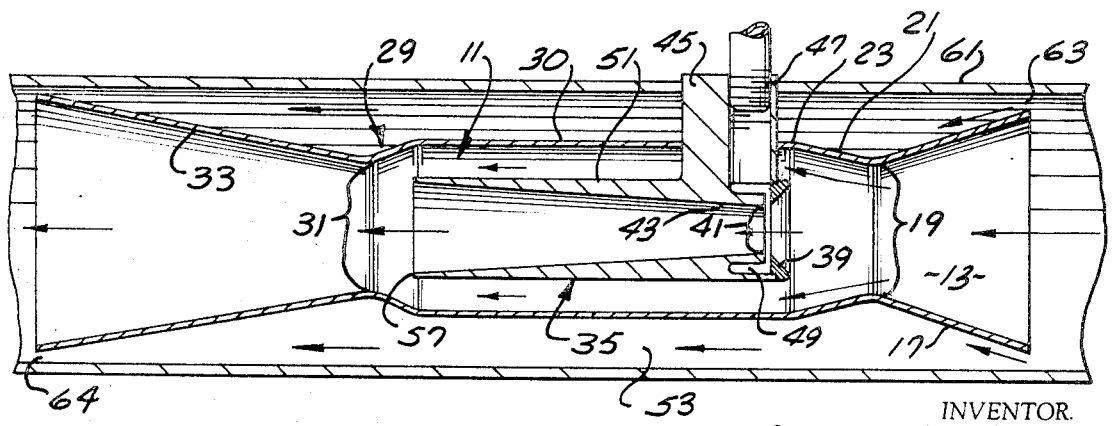
INVENTOR.
ARNOLD L. HANES
BY Sokolski & Wohlgemuth
ATTORNEYS United States Patent Office 3,520,639
Patented July 14, 1970

3,520,639
VENTURI TUBE
Arnold L. Hanes, Topanga, Calif., assignor to Brittain Industries, Inc., Torrance, Calif., a corporation of California
Filed Aug. 21, 1968, Ser. No. 754,403
Int. Cl. F04f 5/16, 5/24, 5/44
U.S. Cl. 417—167  5 Claims

ABSTRACT OF THE DISCLOSURE

A multi-venturi arrangement to effect a vacuum for use in aircraft comprising an outer cylindrical body initially converging to a first throat area, the body extending cylindrically rearward from the throat area, then converging to its terminus. A second body is disposed in the outer one and is provided with a convergent inlet to a throat area, and then a divergent portion. The vacuum line is directed to the throat area of the inner body.

Venturi devices have been in use for some time in aircraft, in order to achieve a vacuum utilized to pneumatically drive gyros and other instruments. The simplest device is comprised of a single venturi tube wherein the inner walls converge and then diverge gradually from a throat area. A line intersecting the throat when connected to other equipment in the plane provides a vacuum source.

Generally, to be most useful in aircraft application it is necessary to provide a vacuum on the order of 3 inches of mercury. This is difficult to achieve at a low air speed of 40 m.p.h. utilizing a single venturi tube. As a result, the venturi tube is normally disposed adjacent to the front of the throat area of a larger venturi tube. As is well known, the gases are accelerated by passing through a venturi tube. Thus, the gases passing through the large or secondary venturi tube are so accelerated and will cause a lower pressure at the tail end of the smaller venturi than if there were no secondary tube present. This in effect significantly increases the velocity of the gases through the primary tube and a greater vacuum is achieved at the line tapping its throat area. However, such a device apparently could not attain three inches of mercury vacuum at the desired low air speed. Additionally, in order to achieve that degree of vacuum, a device had to be mounted external from the body of the airplane so as to receive maximum benefit of incoming airflow. By such an external mounting, the device did present some additional drag resistance and was unattractive. Additionally, the device was subject to icing during bad weather.

Thus, an object of this invention is to provide a venturi device for significantly increasing the amount of vacuum to be obtained.

Another object of the invention is to provide a venturi device which will provide a high vacuum while being mounted within the cowling of an airplane, which allows it to be attractive and to be heated so as not to ice up.

The above and other objects of the invention are accomplished by the embodiments to be described of the herein device utilizing a plurality of venturis or throat areas of convergent-divergent nozzles. As indicated, the prior art had improved upon the basic single venturi by locating it in the airstream of a larger venturi. The herein invention achieves much greater and unexpected results by providing a third venturi or throat area adjacent to the rear of the primary venturi, by extending the housing of the larger secondary venturi to completely surround the primary one and forming such a throat area adjacent to the terminus of the inner primary venturi. By making the total area for air flow through and around the small venturi equal to the large venturi throat area, a high air velocity is created to aid flow through the small venturi. The third throat area can be formed merely by diverging the body of the secondary large venturi at a point adjacent to the terminus of the inner primary venturi, or can be further accentuated by slightly constricting the diameter of the outer venturi body at that same point and then diverging from such a constricted throat area. A further increase in performance can be achieved by providing a cylindrical shroud about the large secondary venturi so that air can pass between the shroud and the outer surface of the larger secondary venturi, in effect creating its own wind tunnel so performance in a cowling is increased. The invention provides a much greater vacuum than prior art devices. Further, the arrangement of the venturis of the herein invention provides this vacuum when the unit is disposed within the cowling of the plane, thus overcoming one of the more undesirable aspects of the prior art.

It is believed the invention will be better understood from the following detailed description and drawings in which:

FIG. 1 is a partially sectioned pictorial view of the first embodiment of this invention;

FIG. 2 is a sectional view taken along line 2—2 of FIG. 1;

FIG. 3 is a schematic representation of a second embodiment of this invention; and FIG. 4 is a schematic representation of a third embodiment of this invention.

Turning now to FIG. 1, there is seen an embodiment of the device 11 of this invention which comprises an inlet portion 13 which can be connected to a duct 15 in the cowling of an airplane. The inlet portion 13 is comprised of a divergent section 17 and a restricted throat area 19 which diverges slightly rearwardly from portion 21. The slightly divergent section 21 terminates at point 23 which is the beginning of the main body portion 27 of the device. Thus, the inlet portion 13 comprises a convergent-divergent nozzle with a throat area 19 wherein the gas is greatly accelerated. The body portion 27 is of constant diameter from the point 23 rearward to a convergent portion 29 wherein a slightly constricted area 31 is formed. The body 27 then again diverges at portion 33.

Suspended within body 27 and just downstream from throat area 19 is the primary venturi device 35 of the invention. The venturi device 35 can be cast and machined of a single block of aluminum or the like and is suspended by an aerodynamically shaped support 37 which extends outwardly through the portion 27 and is affixed thereto by welding or the like. The inner portion of the primary venturi device 35 is comprised of a convergent inlet area 39, a throat area 41, and a gradually tapered exhaust portion 43.

As seen in FIGS. 1 and 2, a hole 45 is tapped in the support 37 and is threaded 47 for suitable fitting to a vacuum line. The hole 45 intersects a circumferential slot 49 that is used as the main pressure tap at the throat area 41 of the primary venturi 35.

It is to be noted that while the inner portion of the main venturi extending from the throat area 41 tapers along portion 43, the outer circumference 51 remains constant and parallels the wall portion 30 of the main housing. The primary venturi 35 terminates just prior to the second throat area 31 formed in the outer housing 29.

Thus, in the operation of the device, the inlet air entering through the duct 15 in the cowling is first constricted and accelerated in the throat area 19. A portion of that accelerated air is again constricted by the inlet 39 of the primary venturi and is accelerated at the throat area 41 where the pressure line is directed. The remainder of the air not passing through the throat area 41 of the primary venturi passes concentrically around the primary venturi in a passage 53 formed by the wall 30 of the housing 27 and the inner wall 51 of the primary venturi. It is of primary importance that the air in this passage retains its high velocity so as to develop a low pressure area at the rear end 57 of the small venturi. This is accomplished by keeping the area constant. This air in passage 53 is constricted in the third throat area 31 prior to passing out through the divergent area 33 together with the air leaving the primary venturi.

Typical prior art devices, for example, have no outside portion similar to the walls 30 extending from the support 37. In the herein invention, the added acceleration of the concentric gas is passing through the passageway 53 through throat area 31 serves to draw the gas at a greater velocity through the throat area 41 of the primary venturi. In other words, the concentric gas in passage 53 when accelerated creates a sucking or vacuum effect through the throat area 31 providing a lower pressure region so that the gas from he primary venturi will rush to the throat area 41 with greater force or velocity. This is effect increases the total throughput of gas in the primary venturi and as is well known, the vacuum obtainable is a function of the velocity past the throat area of a venturi. In view of this, a greater vacuum is obtainable at the throat area 31, or alternatively, the input of initial gas flow from the duct 15 does not have to be as great to achieve, for example, a vacuum equivalent to three inches of mercury as in the prior art devices.

In order to have maximum efficiency, the area of the throat 41 together with the concentric area surrounding it in passage 53 should be equal to or greater than the area of the first throat area 19. If the area for the passage of the air leaving the throat 19 were restricted, an obvious detrimental effect will be had impeding the overall flow through the device. Additionally, it has been found that the best results are obtained when the throat area 31 is equal to the throat area 19.

Turning to FIG. 2, a second embodiment of the invention is shown. The device schematically depicted is identical to that in FIG.1 except that there is no constricted throat area corresponding to that of 31 in FIG. 1 at the rear of the primary venturi device 35. Rather, the main outer body 27 merely diverges from point 55 to form the exit cone 33. The device of this embodiment provides, for example, a 70% increase in pressure over a similar prior art item not provided with extended housing 27 and divergent nozzle 33.

The increase in results in this embodiment is believed due to the fact that the gases in concentric passage 53 are maintained at the same velocity as the inlet gas to the throat area 41 of the primary venturi 35. As the gas in the passage 53 thus passes over the end 57 of the primary venturi it creates a negative pressure therein, aiding to suck or draw the air through the primary venturi at greater rate. Not until the throat area beginning at point 55 is encountered are the gases allowed to dissipate gradually along the conical shaped surface 33.

Thus it can readily be seen that the difference between this embodiment and that of FIG. 1 is the fact that the gas in passage 53 is not further accelerated through a constriction at 55. However, the area at point 55 is a throat which has the effect of accelerating the gas due to the gradual expansion of nozzle area 33 to achieve the improved end result. The device shown in FIG. 1, it is pointed out, provides a 30 percent increase in effective obtainable vacuum over this embodiment. However, not all applications require such a vacuum level.

Turning now to FIG. 4 there is shown a third embodiment of the invention which conforms to the device of FIG. 1 having an additional cylindrical outer shroud 61 surrounding the device 11. The shroud 61 is spatially disposed from the device 11 such that the space 63 between inlet 13 and the shroud 61 is slightly greater than the space 64 between the terminus 65 of the exit nozzle 33 and the shroud. Thus, the air passing between the device 11 and the shroud 61 is accelerated at the terminus 65 where it is constricted causing a wind tunnel effect to draw the air through the main device 11 at even a greater rate. Instead of a complete shroud 61 as shown, the shroud can cover only the exit nozzle portion 33 and achieve nearly the same results since once again it can be seen that the air surrounding the device 11 will still be accelerated at point 65 serving to suck the main flow of gas through the primary venturi at a greater velocity.

I claim:

1. A venturi device for providing a vacuum source comprising:
    an outer tubular walled housing having convergent walls at an inlet end, said walls converging to a said housing extending cylindrically from said, throat area toward an exit end,
    a second housing having outer cylindrically formed walls disposed concentrically within said first housing adjacent said first throat area and extending toward said exit end so as to receive exiting fluid from said first throat area, said exiting fluid being permitted to flow externally around said second housing,
    said second housing having inner walls converging at an upstream end thereof to a second throat area, said inner walls then diverging from said second throat area,
    said second housing terminating upstream of said first housing, and
    means for directing a vacuum line to said second throat area.

2. The device of claim 1 wherein said first housing diverges adjacently downstream from the exit end of said second inner housing to form an exit nozzle.

3. The device of claim 1 wherein said first housing converges adjacently downstream from the exit end of said second housing forming a third throat area and then diverges from said third throat.

4. The device of claim 2 additionally comprising:
    an outer cylindrical shroud spatially concentrically disposed about at least the exit nozzle portion of said outer housing.

5. The device of claim 3 additionally comprising:
    an outer cylindrical shroud spatially concentrically disposed about at least the exit nozzle portion of said outer housing.

References Cited

UNITED STATES PATENTS

| | | | |
|---|---|---|---|
| 2,177,731 | 10/1939 | Long et al. | 230—92 X |
| 2,225,789 | 12/1940 | Metcalf et al. | 103—277 |
| 2,332,694 | 10/1943 | Campbell | 230—95 X |
| 2,352,792 | 7/1944 | Kuster et al. | 230—95 |
| 2,398,766 | 4/1946 | Bergeson | 103—278 X |
| 2,938,464 | 5/1960 | Nielson | 103—278 X |
| 3,174,679 | 3/1965 | Stoker | 230—95 |
| 3,369,735 | 2/1968 | Hoffmeister | 230—95 |
| 3,371,618 | 3/1968 | Chambers | 103—262 X |

DONLEY J. STOCKING, Primary Examiner

W. J. KRAUSS, Assistant Examiner